United States Patent [19]

Arendt

[11] 3,904,876

[45] Sept. 9, 1975

[54] DETERMINATION OF PAPER ASH CONTENT BY X-RAY ABSORPTION ANALYSIS

[75] Inventor: Frank P. Arendt, Wisconsin Rapids, Wis.

[73] Assignee: Consolidated Papers, Inc., Wisconsin Rapids, Wis.

[22] Filed: Sept. 20, 1974

[21] Appl. No.: 507,945

[52] U.S. Cl. ............................ 250/273; 250/359
[51] Int. Cl.² ........................................ G01N 23/20
[58] Field of Search ........... 250/272, 273, 274, 358, 250/359, 360

[56] References Cited
UNITED STATES PATENTS

| | | | |
|---|---|---|---|
| 3,100,261 | 8/1963 | Bigelow | 250/272 |
| 3,114,832 | 12/1963 | Alvarez | 250/272 |
| 3,270,204 | 8/1966 | Rhodes | 250/272 |

*Primary Examiner*—Davis L. Willis
*Attorney, Agent, or Firm*—Gary, Juettner, Pigott & Cullinan

[57] ABSTRACT

Paper containing unknown amounts of a plurality of different minerals, such as titanium dioxide, calcium carbonate, and clay, is subjected to x-ray absorption analysis to quickly determine the weight of each mineral per unit area of the paper. The quantities of the heavier elements are determined by x-ray absorption-edge spectrometry, and the clay is determined by using a single absorption measurement, combined with the data for the heavier elements and the measured mass per unit area of the paper. The technique is adaptable to determine ash content during production of the paper, wherein the necessary readings are obtained with respect to a moving web.

5 Claims, 1 Drawing Figure

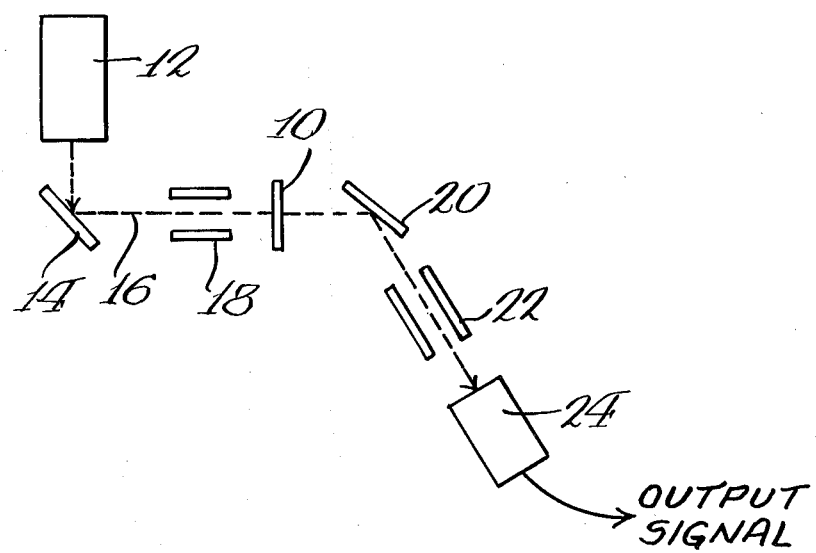

DETERMINATION OF PAPER ASH CONTENT BY X-RAY ABSORPTION ANALYSIS

BACKGROUND OF THE INVENTION

It is well known that paper comprises cellulose fiber matrix containing one or more inorganic metallic compounds or mineral fillers which impart opacity, brightness, surface finish, and other desirable properties. Typical minerals found in paper are clay, calcium carbonate and titanium dioxide, although a wide variety of other minerals, such as compounds of zinc and barium, are also employed. The ash content of paper is normally determined by burning a known quantity of paper under specific conditions and weighing the residue. A more specific description of the procedure may be found in Tappi tentative standard T413 ts-66, but in general, the term "ash content" refers to the weight per unit area of non-combustible materials or minerals in the paper.

In the commercial production of paper, it is highly desirable to control the ash content thereof within prescribed limits, in order to obtain the most desirable physical qualities at the lowest possible cost. Economies are realized if the ash content is maximized, but not to the point where the paper loses strength and printability. Since paper scrap (often referred to as "broke") containing unknown ash is frequently incorporated into the paper stock at irregular intervals, accurate or continuous control of ash content has heretofore not been feasible.

The use of combustion methods allows for an indication of total mineral content, but not of the relative proportion of the various minerals therein. A further difficulty is that carbonates, such as calcium carbonate, may be partially converted into an oxide during combustion, thereby affecting the integrity of the results. Since different added materials impart different properties to the paper, and since certain materials are more expensive than others, it would be desirable to devise a quick and reliable means for determining the quantity of each separate mineral in a given area of the paper.

X-ray spectroscopic methods are commonly used to determine the absence or presence of a given element in a specimen, as described in U.S. Pat. Nos. 3,114,832 and 3,100,261. X-ray absorption-edge analysis is based on the fact that absorbers for x-rays becoming increasingly transparent to the radiation as the wavelength is lowered until, at a certain critical frequency for each specific element, the sample becomes very opaque. This phenomenon exhibits itself as an abrupt discontinuity or "edge" in a plot of wavelength versus absorption coefficient for each element and is explained by the quantized structure of the atom, wherein a specific energy is required to move an electron from a lower to a higher specific level. Continuous application of polychromatic x-radiation will therefore include an energy level, i.e., a discrete frequency, whereat specific level ionization occurs, accompanied by a very large increase in absorption at such energy.

In absorption edge analysis of a particular element in a specimen, two separate beams of x-rays are directed at the specimen, the beams having, respectively, slightly longer and shorter wavelengths of the absorption edge of the element. A greater absorption of the shorter wavelength is a reliable indication of the presence of the element, and the degree of absorption is related to the density of the element in the specimen.

Conventional x-ray absorption-edge analysis is not, however, fully applicable to the measurement of mineral content in the paper. A principal mineral found in paper is clay, which contains the elements aluminum and silicon. Although these elements have absorption edges, the matching x-ray energy is too low to pass through the paper sheet, making edge-absorption analysis impossible.

SUMMARY OF THE INVENTION

In accordance with the present invention, paper containing a plurality of known minerals in unknown amounts are subjected to a plurality of separate x-ray beams to determine loss of intensity of each. Elements having relatively high energy absorption edges are measured by absorption edge analysis. Elements having low energy absorption edges, i.e., too low to allow passage of appropriate x-rays through the paper, are measured by a single high energy beam, combined with the previous measurements and the basis weight or weight per unit area of the paper. The data collected allows for the determination of the amount of each separate mineral per unit area of the paper.

In a typical paper consisting of titanium dioxide, calcium carbonate and clay, the use of only three different x-ray energies, plus a determination of mass per unit area, is all the data required to determine the amount of each mineral per unit area of paper, thus providing a unique and compact technique for measuring such ash components in a short period of time, i.e., less than 5 minutes.

THE DRAWINGS

The FIGURE is a schematic representation of an x-ray spectroscopic apparatus that is suitable for use in connection with the present invention.

DESCRIPTION OF THE PREFERRED EMBODIMENT

Although the method of the present invention is suitable for determining the amount of any mineral in paper, a very large class of papers consist of cellulose and clay, with or without one or both of calcium carbonate and titanium dioxide. The description will therefore proceed on the assumption that the paper consists of significant unknown amounts of cellulose and clay, together with from nil to significant amounts of calcium carbonate and titanium dioxide, said paper being in the form of an essentially homogeneous sheet 10 substantially uniform thickness.

In the apparatus shown in highly simplified form in the drawing, an x-ray tube 12 or other suitable source of x-rays is directed toward an angularly disposed target 14 in a well known manner to produce secondary x-rays having a predominant energy or wavelength, depending upon the composition of the target. The x-ray tube 12 is conventional and comprises an evacuated envelope containing an electron gun directed at an internal target, which in this case is preferably chromium. The electron gun provides a high enough beam voltage, e.g., 50,000 volts, to generate K-line emission spectra of the target element.

In the embodiment shown, the external target 14 is exchanged with others to provide a plurality of separate and different wavelengths, and in the present embodiment, the respective targets contain significant amounts of chromium, titanium and calcium, thereby producing a large proportion of secondary x-rays at, respectively the chromium K$\alpha$ titanium K$\alpha$ and calcium K$\alpha$ levels, depending upon the target selected.

The selected x-ray beam 16 is passed through a beam tunnel 18 and then through the paper sheet 10, at substantially right angles thereto. The sheet 10 may be in the form of a stationary specimen of may be a moving web of paper on a papermaking machine. Since paper is substantially homogeneous and the chemical constituents of a moving web change only gradually in normal fabrication methods, movement of the sheet while conducting x-ray spectroscopy will not substantially affect the accuracy of the results.

A diffraction crystal 20, such as one composed of lithium fluoride, is disposed on the other side of the web in the path of the emerging x-rays, said crystal being adjustable to selectively reflect x-rays at the desired wavelength while dispersing other wavelengths. The crystal 20 thus eliminates extraneous x-ray spectra and is selective for the various wavelengths employed in the analysis.

The diffracted x-rays are passed through a suitable collimator 22, which produces parallel rays, and then into a detector 24, which measures the intensity of the x-rays at a specific wavelength after having passed through the paper sample. The detector 24 may comprise an ion chamber containing a capacitor which stores a voltage proportional to the average intensity of a burst of x-rays. Means (not shown) are also provided for making intensity measurements of x-rays on the selected wavelength in the absence of the paper sample.

It will be understood that the apparatus described above is only illustrative of the various possible arrangements that may be employed. For example, the crystal 20 and detector 24 may be eliminated in favor of an x-ray counter having highly selective responses to different wavelengths. Also, the crystal 20 may be placed in front of the paper sample 10 to remove extraneous x-ray components before passing through the sample.

The x-rays passing through the paper are attenuated or absorbed in relation to the wavelength selected, the chemical composition of the materials in the paper, and the thickness of the paper, which is substantially uniform.

Assuming that the paper contains unknown amounts of titanium dioxide, calcium carbonate, clay and cellulose, the analysis is conducted in the following manner. The calcium K$\alpha$, titanium K$\alpha$ and chromium K$\alpha$ x-rays are passed successively through the sample, and the amount of x-ray attenuation at such wavelengths are determined by the detector 24. Since chromium, titanium, and calcium have atomic numbers which differ successively by two, the frequency of their K$\alpha$ rays may be employed to evaluate the amount of titanium and calcium in the sample by absorption-edge analysis. Specifically, the chromium K$\alpha$ ray has a shorter wavelength than the wavelength corresponding to the absorption edge of titanium, the titanium K$\alpha$ ray has a wavelength falling between the absorption edges of titanium and calcium and the calcium K$\alpha$ ray has a longer wavelength than the absorption edge of calcium, but much shorter than the absorption edges of the aluminum and silicon in the clay.

The amount per unit area of titanium and calcium, if present, may be calculated on the basis of the Bouguer Law wherein:

$$I = I_0 e^{-\mu\sigma}$$

wherein $I_o$ is the intensity of transmitted x-rays in the selected frequency; $I$ is the intensity of x-rays in said frequency after being passed through the sample; $\mu$ is the absorption coefficient of the material; and $\sigma$ is the mass per unit area of the material.

By using calculations in accordance with conventional absorption edge analysis, the chromium and titanium K$\alpha$ rays are used to determine the amount of titanium, and the titanium and calcium K$\alpha$ rays are used to determine calcium. The resultant figures may be converted to weight of titanium dioxide and calcium carbonate by simple conversions based on molecular weights.

In the case of clay, which consists primarily of aluminum silicate, absorption-edge analysis is impossible, since x-rays near the absorption edges of aluminum and silicon do not have sufficient energy to pass through the paper and are completely absorbed. More particularly, any element in paper having an atomic number of 16 or below cannot be measured by conventional x-ray absorption edge analysis because the energy of x-rays required for the measurement would be too low to be transmitted through the paper. Chlorine, having an atomic number of 17 and a corresponding K$\alpha$ energy of about 2.6 kev, would therefore represent the lowest atomic number and energy applicable to absorption edge analysis in paper.

It has been found, however, that the amount of clay may be determined by calculations based on total absorption of the paper on a single wavelength which has sufficient energy to pass through the paper. The intensity loss for the calcium K$\alpha$ rays has been found suitable for this purpose. Since the amounts of titanium and calcium in the paper have been previously determined, absorption of the calcium K$\alpha$ rays by these elements may be excluded or accounted for, leaving only the absorption due to the presence of cellulose and clay.

In accordance with the aforesaid Bouguer Law, the clay and cellulose in the paper will absorb the calcium K$\alpha$ x-rays in accordance with the following relationship:

$$I = I_0 e^{-\mu\sigma}$$

where $\mu$ is the absorption coefficient and $\sigma$ is the mass per unit area.

Combining the absorption attributable to both clay ($\mu_1\sigma_1$) and cellulose ($\mu_2\sigma_2$), the above relationship may be rewritten as follows:

$$I = I_0 e^{-\mu_1\sigma_1 - \mu_2\sigma_2}$$

The mass per unit area of both the clay and the cellulose are unknown, but it is possible to weigh a given sample of paper to determine the mass per unit area thereof, from which may be subtracted the previously determined amounts of titanium and calcium carbonate. As a result, $$\sigma_2 = \sigma_{(total)} - \sigma_1$$

It is therefore possible to eliminate the unknown density for cellulose and solve the equation for clay.

As mentioned, the mass per unit area of the paper may be determined by weighing a sample of a known size. In the alternative, a conventional "beta gauge" may be employed, in which the mass per unit area is determind in proportion to loss of beta rays passing through the paper. The advantage of a beta gauge is that it may be employed on a moving web without the necessity of taking an actual paper sample.

A primary advantage of the invention is the small amount of data required to determine ash content. In conventional absorption-edge analysis, each element is evaluated by employing two different wavelengths which fall slightly above and below the absorption edge of the elements. Instead of the usual six wavelengths that would normally be expected for determination for three materials, the present invention requires absorption measurements on three wavelenghts, plus a determination of the paper density, the later data being routinely measured and easily available in ordinary commercial production methods.

In further illustration of the present invention, the following is a summary of the general equations for a sample having three different elements of unknown quantity. When a monochromatic x-ray beam of intensity $I_o$ is transmitted through an absorber having a mass absorption coefficient $\mu$ cm/gm and a mass per unit area $\sigma$ gm/cm, the transmitted intensity ($I$) is defined as:

$$I = I_o e^{-\mu\sigma} \tag{1}$$

or $$\ln\left(\frac{I_o}{I}\right) = \mu\sigma \tag{2}$$

If the absorber contains three constituents, $$\ln\left(\frac{I_o}{I}\right) = \mu_1\sigma_1 + \mu_2\sigma_2 + \mu_3\sigma_3 \tag{3}$$

where $\mu_1$, $\mu_2$ and $\mu_3$ are the respective mass absorption coefficients for the three constituents, and $\sigma_1$, $\sigma_2$ and $\sigma_3$ are the respective weights per unit area of the three constituents.

When a different monochromatic energy is passed through the sample, $$\ln\left(\frac{I_o'}{I'}\right) = \mu_1'\sigma_1 + \mu_2'\sigma_2 + \mu_3'\sigma_3 \tag{4}$$

where the prime denotes the new monochromatic energy.

Equations (3) and (4) can be solved for $\sigma_2$ as follows:

$$\sigma_2 = \frac{\ln\left(\frac{I_o'}{I'}\right) - \frac{\mu_1'}{\mu_1}\ln\left(\frac{I_o}{I}\right) - \left(\mu_3' - \frac{\mu_1'}{\mu_1}\mu_3\right)\sigma_3}{\mu_2' - \frac{\mu_1'}{\mu_1}\mu_2} \tag{5}$$

When $$\frac{\mu_1'}{\mu_1} = \frac{\mu_3'}{\mu_3}$$

then the coefficient of $\sigma_3 = 0$.
Equation (5) then becomes:

$$\sigma_2 = \frac{\ln\frac{I_o'}{I'} - \frac{\mu_1'}{\mu_1}\ln\frac{I_o}{I}}{\mu_2' - \frac{\mu_1'}{\mu_1}\mu_2} \tag{6}$$

which enables determination of the weight per unit area of the second constituent independent of the others.

Assuming that $\sigma_2$ is determined from equation (6), and further assuming that the total weight per unit area $O_t$ is known, then:

$$\sigma_t = \sigma_1 + \sigma_2 + \sigma_3 \tag{7}$$

Combining equations (7) and (3) to eliminate $\sigma_1$, and solving for $\sigma_3$:

$$\sigma_3 = \frac{\ln\left(\frac{I_o}{I}\right) - (\mu_2-\mu_1)\sigma_2 - \mu_1\sigma_t}{(\mu_3-\mu_1)} \tag{8}$$

EXAMPLE

A paper sample containing calcium carbonate, clay and cellulose in unknown quantities to determine the amount of each in the sample Experimental data was obtained with the use of a Picker laboratory x-ray diffractometer having a chromium x-ray to be operated at 40 kilovolts and 20 milliamps. A 3.69 kev. energy was obtained by causing x-ray fluorescence of a sample containing a high concentration of calcium, thus emitting the CaKα energy. The intensity was measured first without the paper sample in the path ($I_o$) and then with the paper sample in the path ($I$). To further differentiate energy, the energy was diffracted from the lithium fluoride crystal set at the Bragg angle (20 = 113.07°) for 3.69 kev. Detection was accomplished with a scintillation counter.

A 4.51 kev. energy was obtained in a similar manner using a sample containing a high concentration of titanium, thus emitting the TiKα energy. Measurement without the paper sample ($I_o'$) and with the paper sample in the path of the beam ($I'$) were also accomplished in a similar manner. The Bragg angle was adjusted for 4.51 kev (20 = 86.12°).

If the first constituent is cellulose, the second calcium and the third clay, the following mass absorption coefficients ($\mu$) expressed in cm/gm are available from published sources.

| | | | |
|---|---|---|---|
| $\mu_1$ | = 76.6 (cellulose); | $\mu_1'$ | = 42.3 |
| $\mu_2$ | = 141.0 (calcium); | $\mu_2'$ | = 780.0 |
| $\mu_3$ | = 268.3 (clay) | $\mu_3'$ | = 156.0 | and $$\frac{\mu_1'}{\mu_1} = 0.55 \quad \frac{\mu_2'}{\mu_2} = 5.53 \quad \frac{\mu_3'}{\mu_3} = 0.58$$

Since the ratios for cellulose and clay are approximately the same, the conditions for equation (6) are approximately met, therefore:

$$\sigma_2 = \frac{\ln\left(\frac{I_o'}{I'}\right) - 0.55 \ln\left(\frac{I_o}{I}\right)}{702} \quad (6a)$$

Equation 8 becomes:

$$\sigma_3 = \frac{\ln\left(\frac{I_o}{I}\right) - 64.4\,\sigma_2 - 76.6\,\sigma_t}{191.7} \quad (8a)$$

The following experimental data was obtained on a paper sample having a mass per unit area of 0.00761 gm/cm.

```
I_o  = 12375 cps     I  = 5908 cps
I_o' = 6022 cps      I' = 3420 cps
```

Solving equation (6a), $\sigma_2 = 0.000227$ gm/cm$^2$.

Entering $\sigma_2$ into equation (8a), $\sigma_3 = .000740$ gm/cm$^2$.

It will be understood that the use of the foregoing equations is not essential to determination of ash content. Essentially the same results may be and are obtained empirically by the comparison of the raw data with data obtained from a range of samples having known amounts of constituents.

I claim:

1. A method for quantitatively determining the constituents of paper containing cellulose, clay, and from nil to a significant amount of other elements having an atomic number greater than 16, comprising the steps of determining the amount of said other elements by x-ray absorption-edge analysis, measuring the total mass per unit area of the paper, and determining the amount of clay based on (1) the absorption by the paper of monochromatic x-rays having an energy greater than about 2.6 kev., (2) the previously determined amount of said other elements, and (3), the total mass per unit area of the paper.

2. The method of claim 1 wherein the step of determining the amount of said other elements comprises the steps of conducting monochromatic x-ray intensity loss measurements through the paper, said x-rays having respective energies which are respectively above and below the x-ray absorption edge characteristic of the respective other elements.

3. The method of claim 2 wherein at least one of the monochromatic x-rays has an energy falling between the respective absorption edges of two of said other elements, said one x-rays being used as a factor to determine both of said elements.

4. A method for quantitatively determining the amount of constituents of paper consisting essentially of unknown amounts per unit area of cellulose, clay and from nil to a significant amount of calcium and titanium, comprising the steps of conducting respective x-ray absorption measurements with the chromium K$\alpha$, titanium K$\alpha$ and calcium K$\alpha$, using the chromium K$\alpha$ and titanium K$\alpha$ absorptions to determine the mass per unit area of titanium, using the titanium K$\alpha$ and calcium K$\alpha$ absorptions to determine the mass per unit area of calcium, measuring the total mass per unit area of the paper, and determining the amount of clay based on the absorption of the calcium K$\alpha$ energy, the amount, if any, of previously determined titanium and calcium, and the total mass per unit area of the paper.

5. The method of claim 4 wherein the mass per unit area of the paper is determined with respect to the degree of absorption of beta rays by the paper.

* * * * *